United States Patent [19]

Strauch et al.

[11] 4,238,157
[45] Dec. 9, 1980

[54] PROCESS AND ARRANGEMENT FOR THE ALIGNMENT OF IMAGING SYSTEMS

[75] Inventors: Ernst Strauch, Naunheim; Rudi Faatz, Heuchelheim, both of Fed. Rep. of Germany

[73] Assignee: Ernst Leitz Wetzlar GmbH, Wetzlar, Fed. Rep. of Germany

[21] Appl. No.: 8,735

[22] Filed: Feb. 2, 1979

[30] Foreign Application Priority Data

Feb. 3, 1978 [DE] Fed. Rep. of Germany ....... 2804527

[51] Int. Cl.$^3$ .................. G01C 3/00; G01B 11/06; G03B 13/18
[52] U.S. Cl. .................. 356/3; 250/237 R; 354/200; 355/55; 356/381
[58] Field of Search ............... 356/399, 373, 375, 378, 356/3, 9–19, 4, 371, 381; 350/46–47, 6.2; 355/55–63; 179/100.3 P; 354/162, 165, 200–201; 250/237 R, 201, 560

[56] References Cited

U.S. PATENT DOCUMENTS

| | | | |
|---|---|---|---|
| 1,768,874 | 7/1930 | Whitten, Jr. et al. | 350/6.2 |
| 2,255,631 | 9/1941 | Schulman | 350/14 |
| 2,524,807 | 10/1950 | Kallmann | 250/201 |
| 2,851,919 | 9/1958 | Nesvadba | 354/200 |
| 3,125,624 | 3/1964 | Illig et al. | 250/201 |
| 3,387,534 | 6/1968 | Barbieri | 355/57 |
| 3,402,637 | 9/1968 | Durst | 355/62 |
| 3,836,258 | 9/1974 | Gourten et al. | 356/399 |
| 4,007,385 | 2/1977 | Chapron | 357/44 |
| 4,009,397 | 2/1977 | Mulder et al. | 357/15 |
| 4,013,901 | 3/1977 | Williams | 357/92 |
| 4,097,881 | 6/1978 | Katagiri | 354/201 |
| 4,137,465 | 1/1979 | Hart | 357/92 |

OTHER PUBLICATIONS

Berger et al., IBM Tech. Disclosure Bulletin, vol. 15, No. 5, Oct. 1972, pp. 1626-1627.
Electronics (International Edition), Aug. 19, 1976, pp. 4E and 6E, "Junction Field Effect Transistor...".

Primary Examiner—John K. Corbin
Assistant Examiner—Wm. H. Punter
Attorney, Agent, or Firm—Schwartz, Jeffery, Schwaab, Mack, Blumenthal & Koch

[57] ABSTRACT

A process and apparatus for the alignment of the image plane of an imaging system with the interception plane of the image utilizing a measuring mark reproduced by at least two partial pupils of the imaging system. The two imaging beams associated with the partial pupils are distinguishable from one another and at least one partial pupil is moved over the full pupil of the imaging system. A minimum movement of the image of the measuring mark corresponds to alignment of the image and interception planes.

25 Claims, 19 Drawing Figures

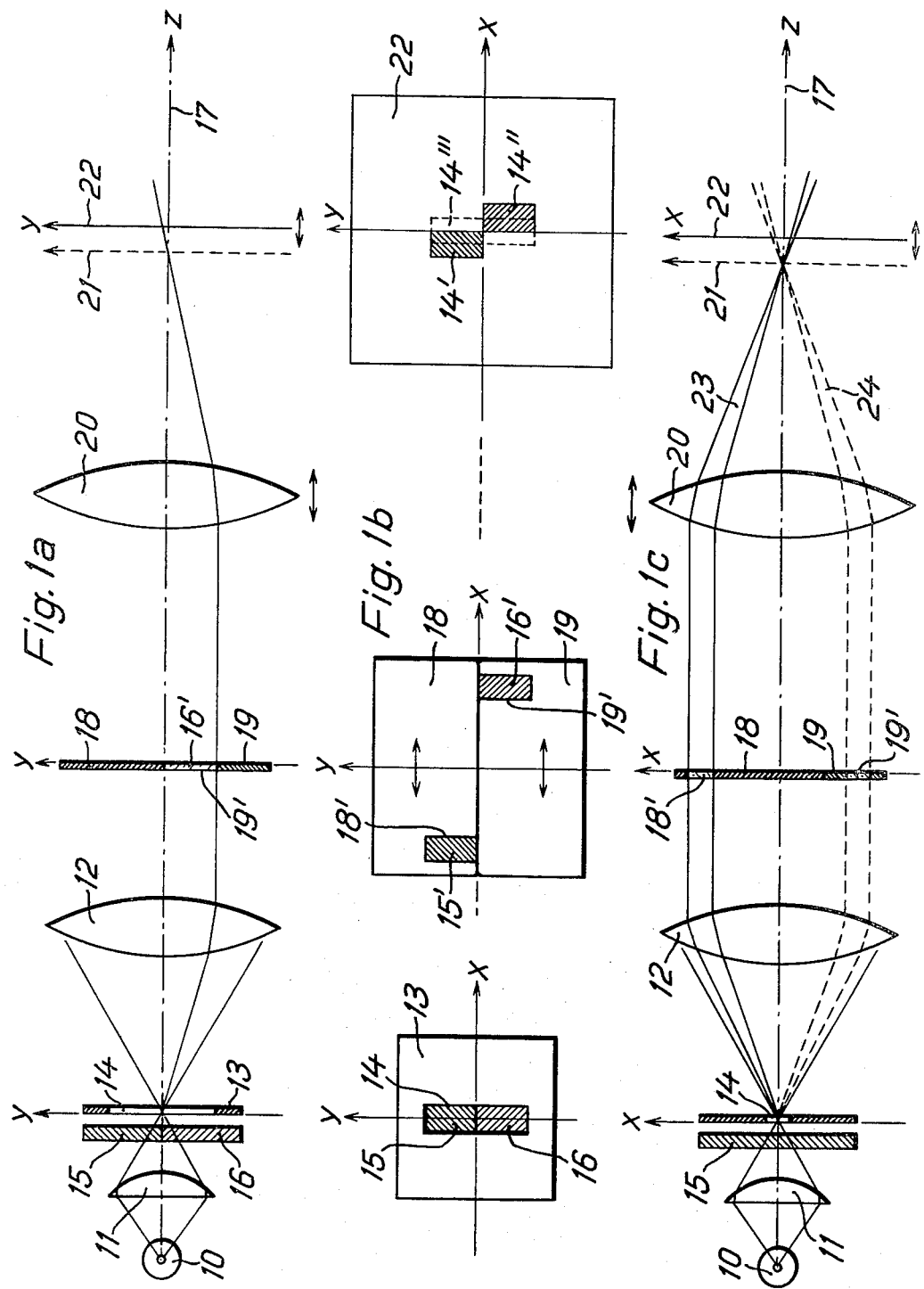

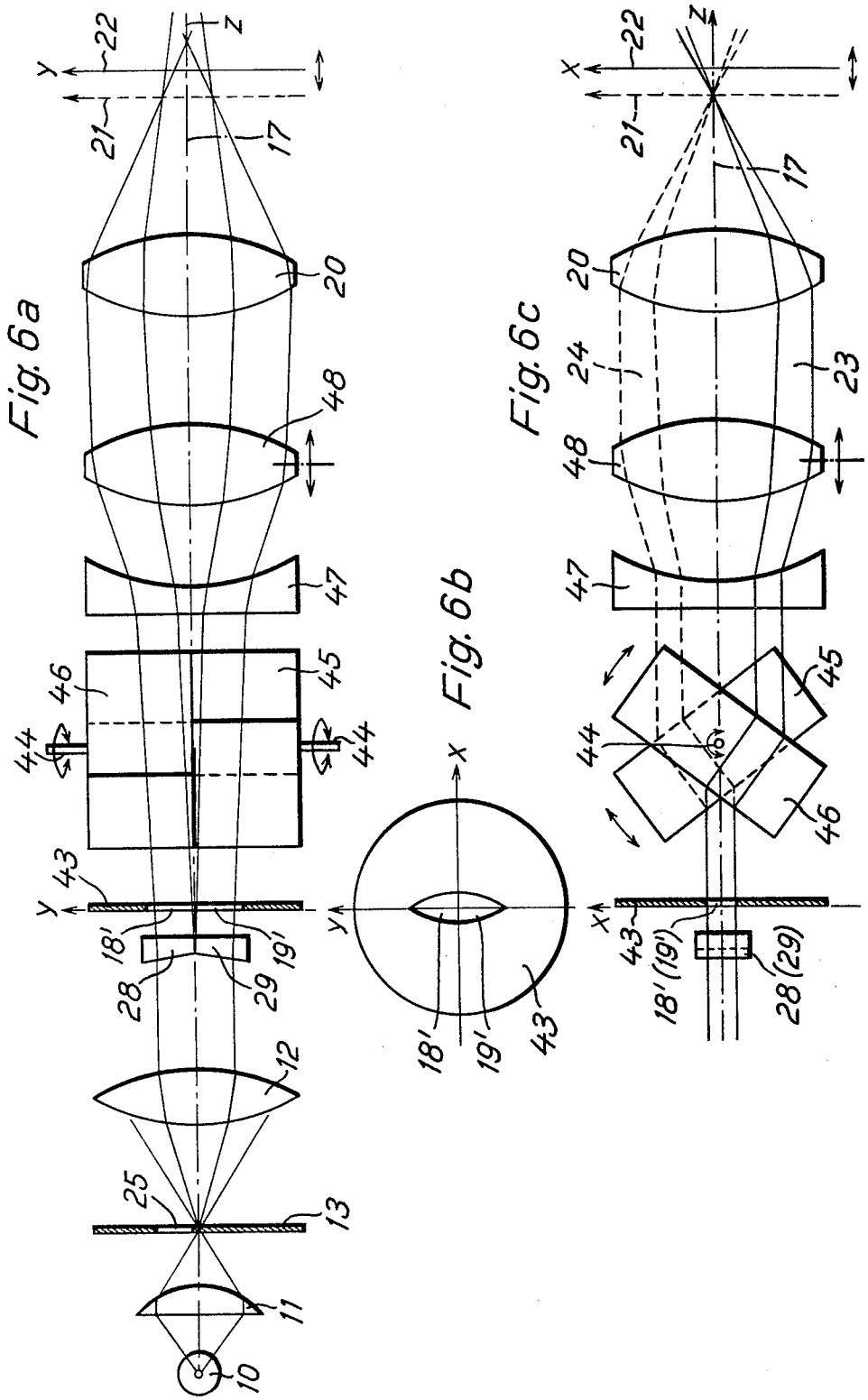

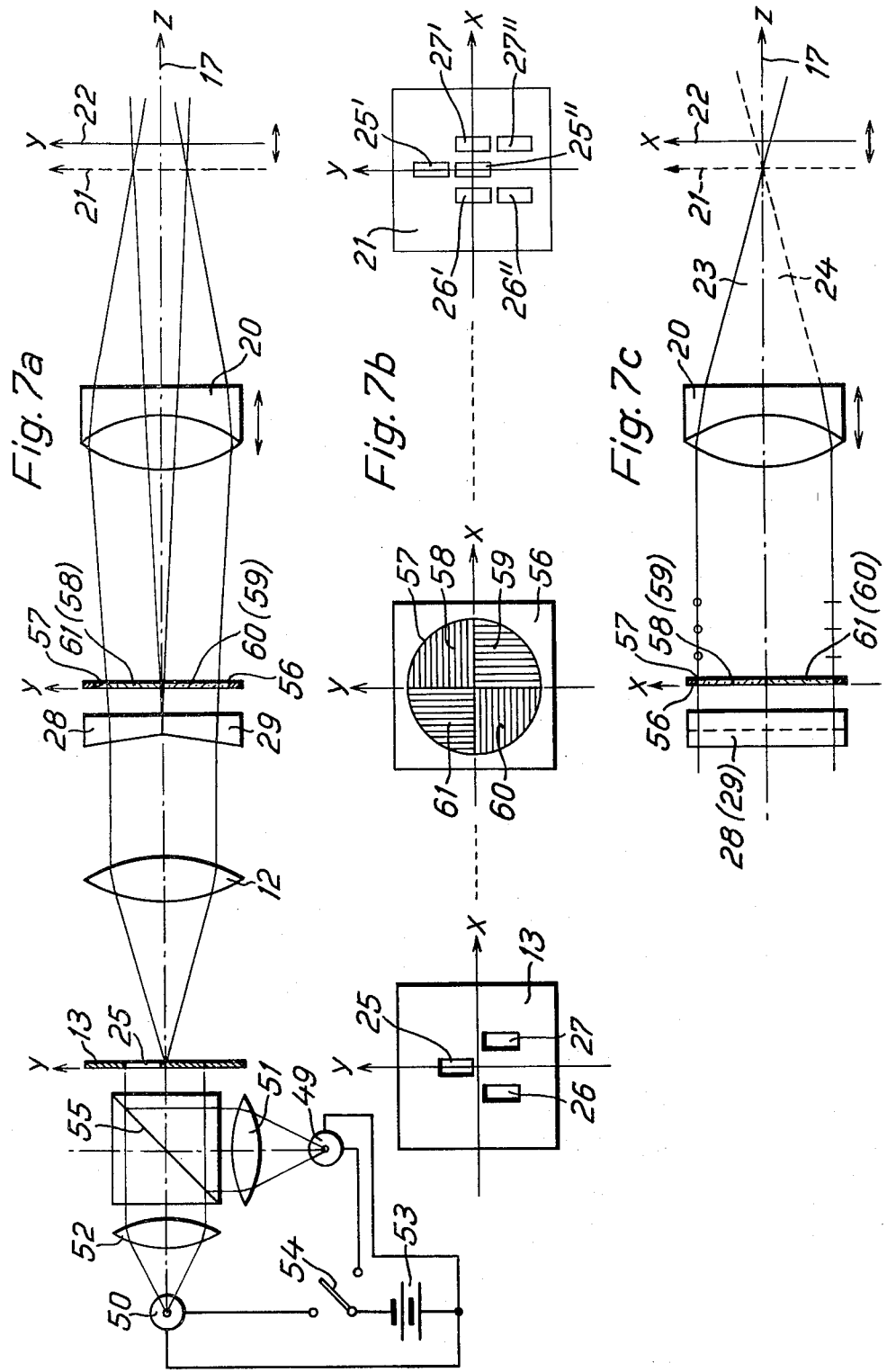

PROCESS AND ARRANGEMENT FOR THE ALIGNMENT OF IMAGING SYSTEMS

BACKGROUND OF THE INVENTION

The invention concerns a process and arrangement for the alignment of the image plane of an imaging system with an image interception plane wherein a measuring mark is reproduced by at least two partial pupils of the imaging system and the imaging beams associated with said partial pupils are affected differentially.

2. Description of the Prior Art

Every optical imaging system comprises a certain imaging plane as a function of the distance of the object, wherein the image of the object appears in sharp focus. When the imaging system is a component of an optical device, then the imaging plane of the imaging system must be coordinated with the image interception plane of said device in order to produce a sharp image. Interception planes in the sense used herein are, for example, the film plane or the ground glass plate of a camera, the intermediate image plane or the graticule plane in a microscope, the photocathode in an image converter tube, or the like. The coordination between the image plane and the plane of interception is designated alignment or tuning.

The simplest visual method of alignment consists of producing an image in the intercepting plane desired by means of the imaging system and to observe this image. The aligning criterion herein is the setting of the image displaying the highest contrast or an image with a characteristic color hue. The advantage of this method resides in the fact that the imaging system is being aligned under the identical conditions whereby it is used. A disadvantage, however, is that consistency of the setting is small because it is affected under serial production conditions, by the fatiguing of the eyes, subjectively in contrast evaluation and differential chromatic eye sensitivity.

In another method, the imaging system is made to produce the image of a slit over two small partial pupils in the intercepting plane desired, said partial pupils being located as much as possible at opposing sides of the overall pupil. The image over the two partial pupils consists either of a mutually overlapping mixed image or a complementary total image (vernier setting). The beams coordinated with the partial pupils may be made optically distinguishable by means of color or polarizing filters. The aligning criterion in both cases is represented by the best possible combination of the partial images into a total image, said partial images moving oppposedly with respect to each other during the adjustment of the imaging system. This coincidence system lends itself to a more secure evaluation than the sharp focusing mentioned hereinabove. It has, however, the disadvantage that the imaging system is used in a different manner during alignment than in the instrument itself. The alignment therefore leads to uniform results only when the image produced by means of the two partial pupils always maintains the same position in the case of all objective lenses of the same computation with respect to the image produced by the total pupil. This signifies in other words that the sharp focusing and coincidence setting procedures must not produce different results.

In a modified embodiment of the aforementioned procedure, imaging of an object takes place by means of one partial pupil, for example a single slit, and by means of the other partial pupil a double slit. Both beams are deflected by prisms (deflecting wedges) so that the image of the single slit rest inbetween the image of the double slit. The aligning criterion here is given by the symmetrical position of the slit images with respect to each other. This setting may be evaluated with more accuracy than even the coincidence setting. It is essential, however, that the refracting edges of the deflecting wedges be adjusted exactly in relation to the direction of the slits, because otherwise the deflecting wedges would introduce a degree of unsymmetry in the mutual position of the slit images, which would be interpreted as a false setting of the imaging system. Even in the case of an initially correct alignment of the deflecting wedges, there are no means provided to indicate subsequent changes in the setting of the device. Obviously, the disadvantage that the image produced by the partial pupils does not necessarily equal the image created by the total pupil, is again present.

It is therefore the object of the invention to provide a method operating with an alignment criterion which avoids the disadvantages of imaging by means of partial pupils of the imaging system, which further improves the reliability of alignment and which is independent of the setting of the deflecting wedges in symmetry alignments.

SUMMARY OF THE INVENTION

The aligning method according to the invention may be applied to all known aligning methods wherein a measuring mark is reproduced by means of two partial pupils, relatively small in relation to the total pupil. The basis of the invention is the movement of at least one of the partial pupils over the total pupil of the imaging system to be aligned. This movement results in a movement of the image of the measuring mark reproduced by said moving partial pupil so long as the system is not aligned. In the case of ideal correction of the imaging system the image of the measuring mark remains statutory, but in any case the movement of the image in this setting is at a minimum. Persistent minimal movements of the image that cannot be eliminated indicate that imaging properties are not constant over the individual partial pupils of the imaging system being travelled over. Correction fluctuations are thus detected in the process. The alignment for minimal image movements thus correspond to the existing state of correction over the entire pupil.

If both partial pupils are moved opposingly with respect to each other, this doubles the path of the movement of the images of the measuring mark relative to each other. The result is a further improvement in setting accuracy.

The new criterion of moving images is superposed on the known image shifts in coincidence or symmetry settings and is independent of these settings. In the case of coincidence setting an additional aligning criterion is therefore obtained, which because of its dynamic behavior is detected particularly well by the eye. In symmetry settings, a further possibilty of ascertaining the adjustment of the alignment device is gained, i.e. when the best symmetry setting obtainable does not coincide with the setting wherein image motion is at a minimum.

The motion of the partial pupils may be caused by the mechanical movement of diaphragms in front of the total pupil of the imaging system to be aligned. However, it may also be produced by inserting in series after stationary diaphragms a plurality of swivelling plane parallel plates, said plates serving to move the imaging beam passing through the diaphragms by means of optical deflection over the total pupil of the imaging system. In the process, the stationary diaphragms preferentially block out imaging beams close to the axis for the measuring mark. Another embodiment consists of producing distinguishable fluxes of light for different partial pupil beams and to activate said beams alternatingly. In the first and the last mentioned case the collimator preceding the diaphragms may be adjusted for any distance from the measuring mark to which the imaging system is to be aligned. In the process, however, setting errors of the collimator will be included in the result of the alignment as a matter of principle.

Because in the method mentioned in second place imaging beams in the vicinity of the axis are employed, only alignments of infinite objects may be performed with the collimator. However, for alignments to finite object distances, an additional system of lenses may be inserted between the plane parallel plates and the imaging system, with said system of lenses reproducing the measuring mark of the collimator at the aligning distance desired. This system of lenses may consist for example of a single lens or a simple Galilei system. The latter is readily converted into a system of variable refracting power by the shifting of one of its elements.

Because the diaphragms outlining the partial pupils already block out beams in proximity to the axis, only, relatively small collimators may be used. Small aberations and alignment errors of the collimator do not enter the result of the alignment, because their effect is constant if by means of optical deflection the same beam is being moved over the total pupil of the imaging system.

BRIEF DESCRIPTION OF THE DRAWINGS

The invention is described in detail in the following description taken in conjunction with the drawings, wherein:

FIGS. 1a-c show an alignment arrangement in accordance with the invention using polarizing filters;

FIGS. 6a-c illustrate an arrangement of the invention with deflecting wedges and optically moved partial pupils; and FIGS. 7a-c illustrate an arrangement of the invention with the alternating activation of distinguishable light fluxes for different partial pupils.

DETAILED DESCRIPTION OF THE PREFERRED EMBODIMENT

Figure 2A:
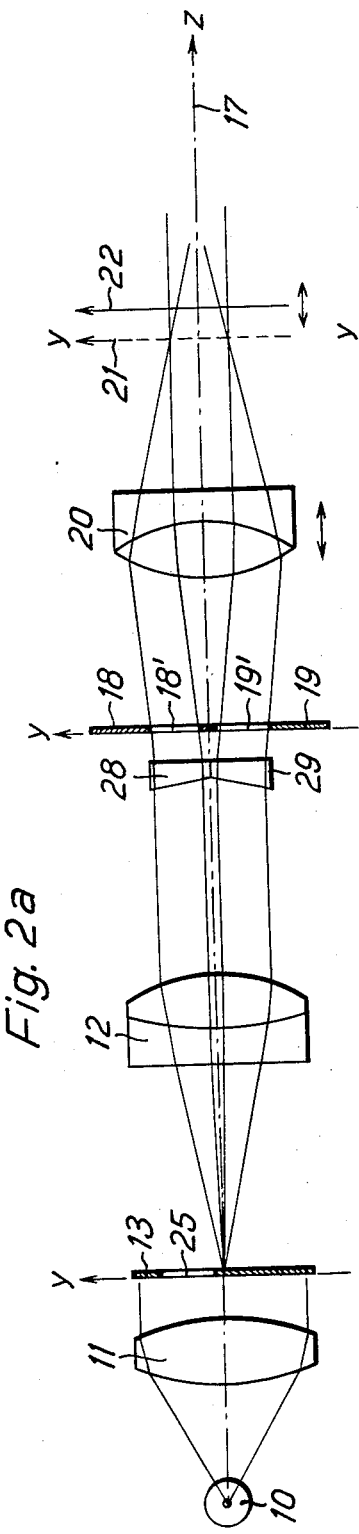
FIGS. 2a-c show an aligning arrangement in accordance with the invention with deflecting wedges and mechanically moved diaphragms.

In FIG. 1a, a section through the y/z plane of the aligning arrangement is represented, wherein the y axis was chosen in the direction of the longitudinal dimension of the measuring mark and the z axis in the direction of the optical axis of the arrangement. FIG. 1b contains sections through the x/y planes of the aligning arrangement, whereby the x axis is perpendicular to the y axis. FIG. 1c shows a section through the x/z plane. All of the structural components displayed may be mounted for example on riders of an optical bank.

The aligning arrangement contains an illuminating assembly consisting of a light source 10, a condenser 11 and a collimator 12. In the focal plane of the collimator there is a measuring mark in the form of a slit 14 cut into a carrier 13. A polarizing filter comprising two parts 15 and 16 polarized perpendicularly to each other, is located in the direction of the light in front of the slit, said polarized parts being adjacent to each other on the optical axis of the assembly along the x axis. Alternately, color filters may be utilized in place of the polarizing filters. Two optically distinguishable halves of the slit are formed in this manner.

The collimator 12 is followed in the direction of the light by a diaphragm holder 18/19 with the diaphragm apertures 18' and 19'. A polarizing filter 15' is coordinated with the diaphragm aperture 18', said polarizing filter having a polarizing direction parallel to that of the polarizing filter 15. The same is true for the diaphragm aperture 19' associated with the polarizing filter 16'. The diaphragm holders 18 and 19 are continuously, discretely or oscillatorly displaceable along the x axis with respect to each other. The imaging beams passing through the diaphragm apertures then illuminate different partial pupils of the subsequent imaging system 20.

The imaging system 20 to be aligned comprises the image plane 21, shown by the broken line. The intercepting plane 22 provided by a device which is not shown, for the image, is located in the direction of the light behind the image plane 21. By means of the alignment, the image plane 21 and the intercepting plane 22 are to be brought into alignment. For this purpose, the imaging system 20 is to be displaceable in the z direction.

In the position of the diaphragm apertures 18' and 19' with respect to each other, shown in FIG. 1b, an image of the slit 14 appears on the intercepting plane 22, the two halves of the slit 14' and 14" being unsharp and offset in relation to each other in the direction of the x axis. The beam represented in FIG. 1c demonstrates the generation of this image offset in the intercepting plane 22. The figure also shows clearly that when the diaphragm apertures are shifted to the other side of the pupils, i.e. when the partial beam 23, indicated by the solid line, and the partial beam 24, broken line, are interchanged, the two slit images 14' and 14" migrate along the x axis.

It is further seen from the path of beam of FIG. 1c that in case of ideal imaging, the two partial beams 23 and 24 intersect in one point. Therefore, when the image plane 21 and the intercepting plane 22 coincide, the slit image 14'" shown in FIG. 1b by means of broken line, is generated. The aligned position is thus indicated by the combination of the two slit images into a continuous slit image and by the stationary behavior of the slit images during movements of the diaphragm apertures.

The situation is different, however, when the imaging system 20 contains aberations. Then, the position of the image plane 21 depends on the identity of the parts of the total pupil contributing to the generation of the image. Then, for any static setting of the diaphragm apertures 18' and 19' in relation to each other, a complete slit image 14'" may be generated in the intercepting plane by shifting the imaging system 20 along the z axis. However, in another diaphragm setting it would then be necessary to again correct the aligning position.

In the case of the dynamic aligning with moving diaphragms this results in a movement of the slit images 14′ and 14″ that cannot be eliminated. The setting of the imaging system 20 to a minimum motion of the image therefore automatically takes into account the imaging behavior over the full pupil of the imaging system 20. Additionally, a qualitative statement concerning the state of correction of the imaging system becomes feasible.

Figure 2B:
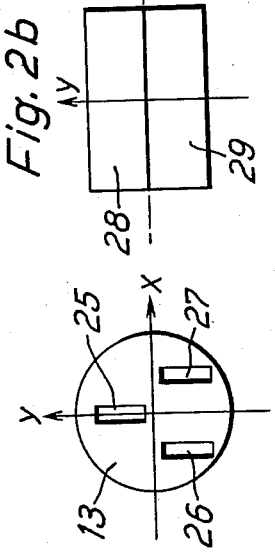
Figure 2C:
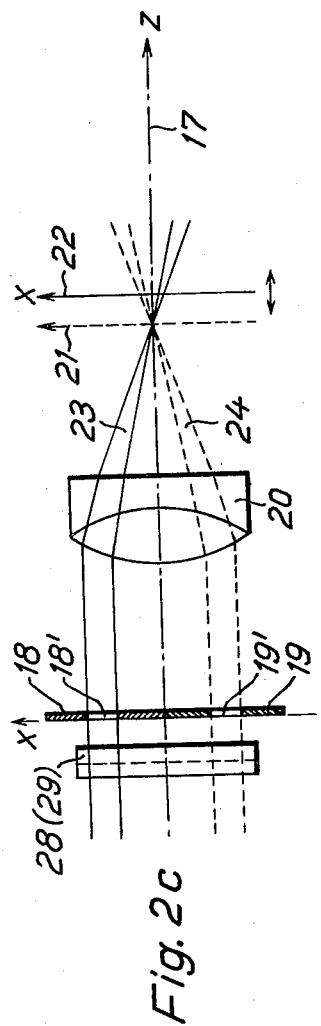

The representation in FIGS. 2a–c resembles that in FIGS. 1a–c. Similar parts are designated similarly. The carrier 13 here comprises three slits 25, 26, 27 as the measuring marks. The longitudinal axis of the slit 25 is located on the y axis and represents an axis of symmetry for the slits 26 and 27. In addition, the three slits are offset in height in relation to each other symmetrically with respect to the x axis. The path of beam of the collimator in this arrangement comprises two deflecting wedges 28, 29, said deflecting wedges having refracting edges parallel to the x axis and passing through the z axis. These deflecting wedges produce two images of the measuring mark, namely, 25′, 26′, 27′ and 25″, 26″, 27″, which are offset along the y axis with respect to each other (FIG. 2b).

The magnitude of the deflection is chosen so that the image 25′ of the measuring mark is positioned between the mark images 26′ and 27′. Only the observation of said images of the mark is essential for the process of alignment.

When the refracting edges of the deflecting wedges 28, 29 are adjusted correctly, the aforementioned images of the measuring mark are offset with respect to each other in a manner exactly parallel to the y axis. This signifies that in the image plane 21 the image 25″ of the mark is positioned symmetrically with respect to the images 26′ and 27′ of said mark. Alignment according to the arrangement illustrated in FIG. 2 is based upon this criterion. However, if the refracting edges of the deflecting wedges are inclined with respect to the x axis, the images of the measuring mark are displaced along a straight line, said line being positioned perpendicularly to the refracting edges and thus inclined to the y axis. This results in an unsymmetrical position of the image of the mark 25″ with respect to the images 26′ and 27′ of the mark.

An identical unsymmetrical position of the images of the mark is also obtained according to FIG. 2c in the interception plane 22, if the latter does not coincide with the image plane 21 of the imaging system 20. An observer therefore will be unable to decide whether the unsymmetrical position of the mark is the result of faulty alignment or incorrect adjustment of the deflecting wedges.

Figure 3:
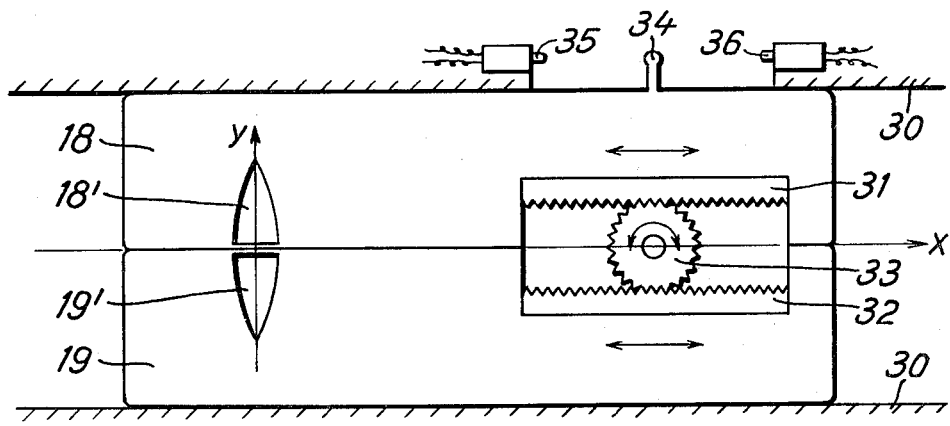
FIG. 3 shows an arrangement for the mechanical activation of the diaphragms.

According to the invention, the diaphragm carriers 18 and 19 are arranged displaceably. A possible embodiment for moving the carriers 18 and 19 for producing partial pupils moving opposingly with respect to each other is shown in FIG. 3. Therein the diaphragm carriers 18 and 19 are supported in a frame 30 for displacement in the direction of the refractive edge of the prisms (see FIGS. 2A and 2B). Outside the optical path of beam of the arrangement, the diaphragm carriers are equipped with gear racks 31, 32, said racks being engaged by a toothed gear. The gear is mounted on the axle of a motor, not shown. The rotation of the toothed gear causes the diaphragm carriers to be displaced with respect to each other. A stop pin 34 is mounted on one of the moving diaphragm carriers striking the switching contacts 35, 36. The contacts 35, 36 are secured on the frame 30 and define the terminal positions of the motion of the diaphragm carrier. When the stop pin 34 triggers the contacts, the latter produce a switching pulse whereby the direction of rotation of the drive motor of the toothed gear 33 is reversed.

The diaphragm apertures 18′ and 19′ are in the shape of one-half of a circular lune. The radius of the curving sides is correlated with the radius of the total pupil of the imaging system 20. In a complementary manner, the position of the switching contacts 35 and 36 is chosen so that even in the boundary positions of the diaphragm carriers the entire light flux passing through the diaphragm apertures illuminates a partial pupil of the imaging system 20.

Figure 4:
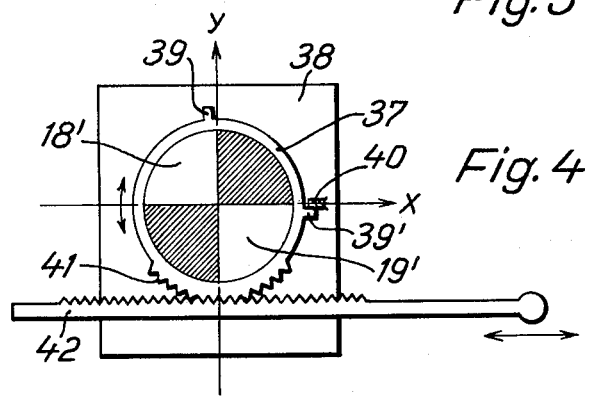
FIG. 4 illustrates an arrangement for the jogging movement of the diaphragms.

FIG. 4 demonstrates another possible embodiment of the movement of the diaphragms. A circular diaphragm carrier 37 is mounted rotatingly in a frame 38. Two stop pins 39, 39′ are mounted on the diaphragm carrier, said stop pins serving to define in cooperation with a bolt 40 fastened to the frame 38, two terminal positions for the diaphragm carrier. The diaphragm apertures 18′, 19′ here are in the shape of circular segments. The rotation of the diaphragm carrier 37 is initiated by means of the cooperation of a gear rim 41 and a toothed rack 42 displaceable in the frame 38. This arrangement is particularly suitable for the abrupt changing of the diaphragm apertures from one terminal position to the other.

As may be seen from the beam path shown in FIG. 2c, movements of the diaphragm apertures 18′ and 19′ also causes the image of the mark— produced in the intercepting plane 22 by the associated partial pupil beams 23 and 24—to wander. This motion is independent of the prevailing symmetry position of the images 25″ and 26′, 27′ with respect to each other. Only when the intercepting plane 22 and the image plane 21 coincide is there a minimum of motion or none at all. When the position of minimum image motion coincides with the position of symmetry for the images of the mark, the deflecting wedges are adjusted correctly, otherwise, they may be readjusted by means of the new alignment criterion.

Figure 5:
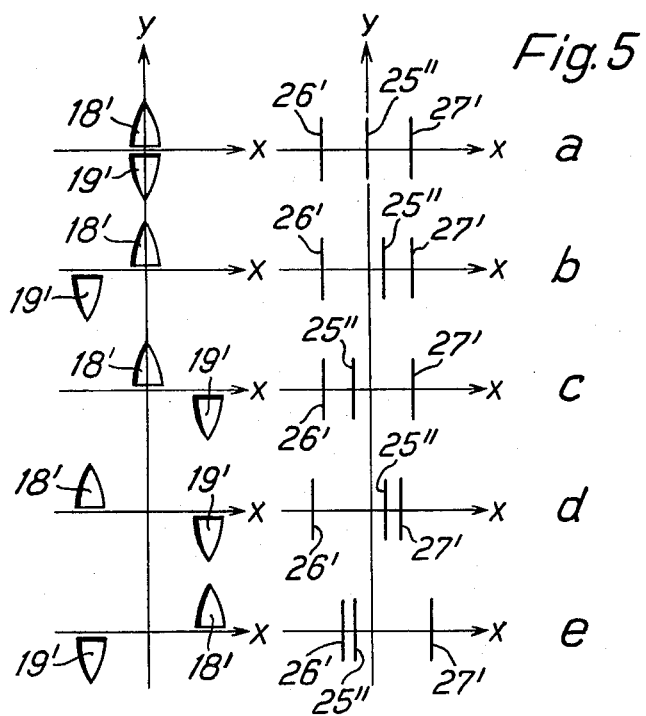
FIGS. 5a-e show the effect of diaphragm setting on the position of measuring mark images in an arrangement as shown according to FIG. 2.

FIG. 5 illustrates the effect of the diaphragm setting on the reciprocal position of images of the measuring mark in the unaligned plane of interception. It is assumed that the adjustment of the deflecting wedges is correct. FIG. 5a is therefore based on the symmetrical position of the images of the mark, said images being symbolized by lines.

If, for example, only one of the diaphragms is displaced, as shown in FIGS. 5b and 5c, then possibly the mark images 26′ and 27′ remain stationary and the image 25″ of the mark changes its position with respect to the y axis symmetrically. The observer derives his information from the variation of the distance to the mark images to the right and the left.

In FIGS. 5d and e, both diaphragms are moved opposingly to each other. The resulting changes in distance are twice as large as in the preceding example, because of the additional movement of the outer images of the mark. In this manner, an arrangement with opposing movements of the two diaphragms is rendered more sensitive especially in the vicinity of the aligned position than in the case of movements of only one of the diaphragms.

The aligning arrangement shown in FIGS. 6a to 6c is similar in its fundamental design to the arrangement of FIGS. 2a–2c. The difference consists of the manner of the deflection of the imaging beam for the measuring mark through the partial pupils of the imaging system 20. The diaphragm apertures 18′, 19′ limiting the imaging beam have the configuration of a circular half lune. They are arranged fixedly in a diaphragm carrier 43. The longer axis of symmetry is located on the y axis, the shorter on the x axis. Only imaging beams in the vicinity of the axis of the collimator are thus included. It is therefore possible to use relatively slightly opened collimators.

The diaphragm apertures 18′ and 19′ follow in line in this arrangement two plane parallel plates 45, 46 rotatable around an axis 44. The axis of rotation 44 is parallel to the y axis of the arrangement.

Upon their passage through the plane parallel plates, the imaging beams are displaced parallel to the z axis (FIG. 6c) to a lesser and greater extent as a function of the inclination of the plates with respect to the x axis. The thickness and the angle of inclination of the plane parallel plates may be chosen so that the partial beams 23 and 24 may sweep over the full pupil of the imaging system 20.

In an alignment of the imaging system 20 for a finite object distance, the origin of the collimated beam leaving the plane parallel plates must be reproduced by a subsequent optical system at the object distance desired. The Galilei system comprises a negative lens 47 and a positive lens 48, is provided for this purpose. The positive lens 48 may be displaced along the optical axis 17 (FIG. 6c) so that different object distances may be simulated thereby providing a means for varying the refracting power of the lenses. FIG. 7 demonstrates an arrangement wherein the shifting of the partial pupils involved in the imaging of the measuring mark is obtained by means of the alternating activation of distinguishable light fluxes. The advantage of this arrangement consists of the fact that no moving parts are required for the displacement of the partial pupils.

The illuminating system herein comprises two sources of light 49 and 50 together with the condenser lenses 51 and 52. The light sources may consist for example of light emitting semiconductor diodes, supplied by means of a common source of power 53. An alternating switch 54 inserted in the supply circuit alternatingly activates one or the other source of light. Obviously, an electronic switch having a suitable switching frequency, may also be used for the periodic control of the switching functions.

The light sources are followed in line by a polarizing divider 55 having a dividing layer positioned at 45° to the optical axis 17 of the arrangement, said dividing layer serving to polarize the reflected portions of the beam perpendicularly to the transmitted portions. By means of the alternating activation of the light sources 49, 50 therefore two optically distinguishable light fluxes are becoming effective in sequence.

In order to limit the partial pupils, the deflecting wedges 28, 29 are followed in line by a diaphragm carrier 56 with a diaphragm aperture 57. The diaphragm aperture is divided through the x, y axes into four circular segments 58, 59, 60, 61, said segments being filled alternatingly by polarizing filters, polarizing perpendicularly with respect to each other (FIG. 7b) or by different color filters. By means of the alternating activation of the sources of light therefore the partial pupil pair 58/60 and the partial pupil pair 59/61 are used alternatingly for the reproduction of the measuring marks 25, 26, 27. This results in the shifting of the images of the measuring marks in the plane of interception 22 (FIG. 7c), described on several occasions hereinabove. The division of the partial pupils into circular quarter segments as indicated, has the advantage that by adapting the diameter of the diaphragm aperture 57 to the diameter of the full pupil of the imaging system 20, said imaging system may be aligned with the beam limitations whereby it will be used in the aligned state.

The pupil diaphragm 57 may also be designed with a configuration so that the segments 58/61 are employed as semicircles without polarization filters. The images 26′, 27′ of the marks are produced through these partial pupils. The image 25″ of the mark is produced alternatingly through the partial pupils 59,60. The conditions shown in FIG. 5b and 5c are then obtained in relation to the movements of the image. Obviously, in place of the visual observation of the movements of the image described heretofore, photoelectric detection of the movements of the images of the mark may also be employed.

While particular embodiments of the invention have been shown and described, it will be obvious to those skilled in the art that various changes and modifications may be made without departing from the essential features of the present invention and, therefore, the aim in the appended claims is to cover all such changes and modifications as fall within the true spirit and scope of the invention.

What is claimed is:

1. A process for the alignment of the image plane of an imaging system with a plane for the interception of the image, wherein at least one measuring mark is reproduced by at least two partial pupils of the imaging system comprising the steps of moving at least one of the partial pupils (18′, 19′; 58, 59, 60, 61) over the full pupil of the imaging system (20) and selecting a minimum movement of the image depending on the alternating use of the partial pupils as the criterion of said alignment.

2. A process according to claim 1, wherein said moving step comprises displacing a diaphragm (18, 19) over the full pupil of the imaging system (20).

3. A process according to claim 1, wherein said moving step comprises deflecting the beam associated with said at least one partial pupil.

4. A process according to claim 1, wherein said moving step comprises alternately activating light fluxes with differential optical properties.

5. A process according to claim 1 wherein said moving step comprises moving both partial pupils opposingly with respect to each other over the full pupil of the imaging system.

6. A process according to claim 1 wherein said moving step is a continuous displacement of said at least one partial pupils.

7. A process according to claim 1 wherein said moving step is an abrupt displacement of said at least one partial pupils.

8. A process according to claim 1 wherein said moving step is an oscillatory moving.

9. Apparatus for the alignment of an image plane of an imaging system with a plane for the interception of the image, said apparatus comprising:
(a) at least one measuring mark,
(b) means for producing at least two distinguishable imaging beams, said imaging beams reproducing said at least one measuring mark by two partial pupils of the imaging system, (c) means for adjusting the relative position of the imaging system and the interception plane, (d) said beam producing means comprising at least two diaphragm apertures, and (e) means for displacing at least one of said diaphragm apertures over the full pupil of the imaging system.

10. Apparatus as recited in claim 9 further comprising filter means associated with each of said diaphragm apertures.

11. Apparatus as recited in claim 10 further comprising:
a light source,
a condenser positioned along an optical axis of said apparatus,
collimator means positioned along said optical axis for illuminating the full pupil of the imaging system to be aligned, and
said measuring mark positioned in a focal plane of said collimator means.

12. Apparatus as recited in claim 11 wherein said filter means comprises color filters.

13. Apparatus as recited in claim 11 wherein said filter means comprises polarizing filters.

14. Apparatus as recited in claim 9 further comprising a prism associated with each of said diaphragm apertures, said prism deflecting the imaging beams in opposite directions.

15. Apparatus as recited in claim 14 wherein said prisms have refracting edges and said means for displacing comprises means for displacing said diaphragm apertures in the direction of the refracting edge of said prisms.

16. Apparatus as recited in claim 10 or 14 wherein said at least two diaphragm apertures are each displaceable in a direction parallel to one another and said apparatus further comprises a common drive means for displacing said diaphragm apertures.

17. Apparatus as recited in claim 10 or 14 wherein said at least two diaphragm apertures are each displaceable and said apparatus further comprises a carrier mounted for rotation around an optical axis of said apparatus, said diaphragm apertures mounted on said carrier in diametrically opposing positions with respect to one another whereby said partial pupils may be moved rapidly into positions associated with different zones of the full pupil of the imaging system.

18. Apparatus for the alignment of an image plane of an imaging system with a plane for the interception of the image, said apparatus comprising:
(a) at least one measuring mark, (b) means for producing at least two distinguishable imaging beams, said imaging beams reproducing said at least one measuring mark by two partial pupils of the imaging system, (c) means for adjusting the relative position of the imaging system and the interception plane, (d) said beam producing means comprising a diaphragm aperture located centrally along an optical axis of said apparatus and prism means having refracting edges for oppositely deflecting said imaging beams, said prism means positioned on one side of said diaphragm aperture away from said interception plane, and (e) two plane parallel plates positioned on the other side of said diaphragm aperture, said plates having surfaces parallel to said refracting edges of said prism means, at least one of said plates mounted for rotation about an axis perpendicular to said refracting edge of said prism means for displacing at least one partial pupil over the full pupil of the imaging system.

19. Apparatus as recited in claim 18 wherein both of said plates are rotatably mounted about an axis perpendicular to said refracting edge of said prism means.

20. Apparatus as recited in claim 19 wherein both of said plates are rotatably mounted about a common axis of rotation, said common rotation axis intersecting said optical axis.

21. Apparatus as recited in claim 20 further comprising:
a light source,
a condenser positioned along an optical axis of said apparatus,
collimator means positioned along said optical axis for illuminating the full pupil of the imaging system to be aligned, and
said measuring mark positioned in a focal plane of said collimator means.

22. Apparatus as recited in claim 21 wherein said imaging system comprises a plurality of lenses.

23. Apparatus as recited in claim 22 further comprising means for varying the refracting power of said plurality of lenses.

24. Apparatus as recited in claim 18 or 23 wherein said diaphragm aperture is formed by halves of circular lunes.

25. Apparatus as recited in claim 9 wherein said beam producing means further comprises means for alternately producing two distinguishable light fluxes.

* * * * *